United States Patent [19]

Kopena

[11] 4,447,249
[45] May 8, 1984

[54] BLOWING WOOL SEPARATOR METHOD AND APPARATUS

[75] Inventor: David M. Kopena, Grand Rapids, Ohio

[73] Assignee: Owens-Corning Fiberglas Corporation, Toledo, Ohio

[21] Appl. No.: 408,397

[22] Filed: Aug. 16, 1982

[51] Int. Cl.³ ...................... C03B 37/03; C03B 37/07
[52] U.S. Cl. ........................... 65/4.4; 65/9; 65/10; 65/29; 55/21; 55/270; 55/408; 156/62.2; 209/288
[58] Field of Search .................. 65/4.4, 9, 10, 29; 210/808, 741, 107, 101; 209/288; 55/21, 270, 408, 409; 156/62.2

[56] References Cited

U.S. PATENT DOCUMENTS

| | | | |
|---|---|---|---|
| 3,332,114 | 7/1967 | Oja | 65/9 X |
| 3,631,982 | 1/1972 | Lejeune | 210/741 |
| 4,267,060 | 5/1981 | Miller | 210/741 |
| 4,377,401 | 3/1983 | Laughlin | 65/10 X |

Primary Examiner—Robert L. Lindsay, Jr.
Attorney, Agent, or Firm—Ronald C. Hudgens; Philip R. Cloutier

[57] ABSTRACT

Method and apparatus are disclosed for recovering blowing wool from an air stream by introducing the stream out aa drum rotating in a sealed shroud, the speed of rotating be adjusted in response to the pressure differential across the surface of the drum.

10 Claims, 1 Drawing Figure

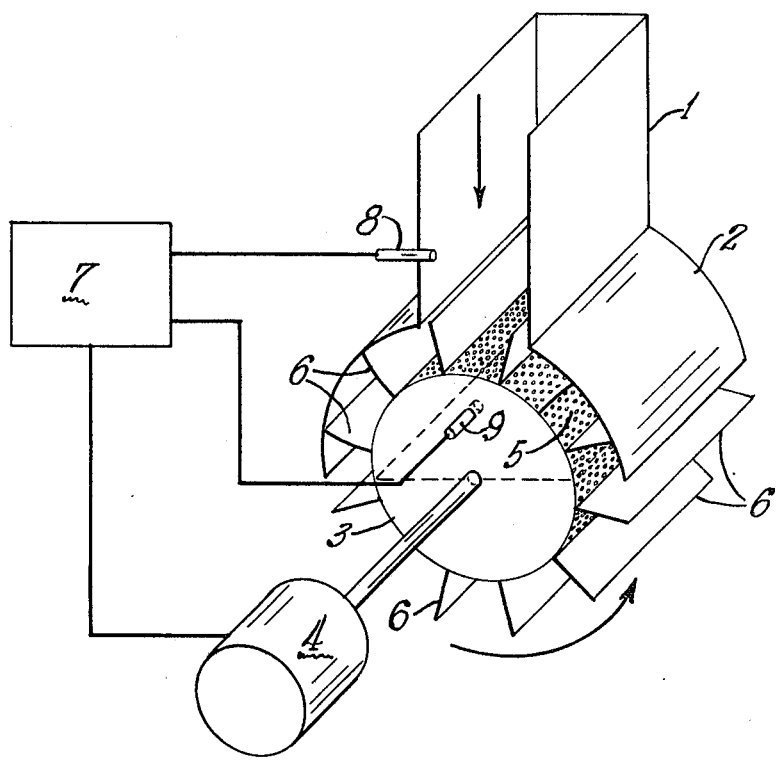

BLOWING WOOL SEPARATOR METHOD AND APPARATUS

This invention relates to a blowing wool separator.

In one of its more specific aspects, this invention relates to a rotary wool separator employed for separating blowing wool from its transporting gases.

BACKGROUND OF THE INVENTION

In the glass wool industry, it is conventional to produce glass wool in small sizes of various shapes. Such glass wool is known as blowing wool and is produced by cutting wool in the form of blankets into cubes, etc. of the desired size. These sizes, or particles, are then transported by means of a gaseous stream to a bagger, prior to which the wool particles are separated from the transporting gases by a rotary wool separator.

The rotary wool separator comprises a rotating drum having a foraminous surface, the drum being positioned within a shroud which serves as the discharge from the conduit conducting the wool-gaseous stream mixture. By drawing a vacuum from the inside of the drum, the gas, hereinafter referred to as air, is drawn through the surface of the drum while the wool accumulates on the exterior surface thereof. As the drum continues rotating, the accumulated wool falls, or is blown, from the drum and is bagged.

This system has two disadvantages. The first is that there is a considerable loss of vacuum due to air leakage around the drum, up into the shroud and through that surface of the drum through which the vacuum is drawn.

The second is that a considerable quantity of very fine glass particles is drawn through the foraminous surface of the drum with the air. These particles tend to accumulate and clog the subsequent equipment through which the air is processed for cleaning and represent a considerable loss of glass which, if retained in the bagged wool, would represent further insulation values.

The method and apparatus of this invention is directed to the solution of these problems.

STATEMENT OF THE INVENTION

According to this invention there is provided apparatus comprising a conduit opening into a shroud.

A rotatable drum having a foraminous surface is positioned to rotate within the shroud and the drum is adapted with flexible vanes extending outwardly from its surface, the vanes contacting the shroud. Vacuum producing means is connected with the internal portion of the drum to establish a pressure drop across a portion of the foraminous surface of the drum. Two static pressure probes, one positioned within the conduit and one positioned within the drum measure the pressure differential therebetween and a differential pressure transmitter, responsive to the differential, controls the current to a motor to alter the speed of the motor and the rate of rotation of the drum.

Also there is provided a method of improving the recovery of glass blowing wool which comprises introducing the glass blowing wool into contact with the foraminous surface of a revolving drum, establishing a vacuum within the drum to create a pressure differential across the surface of the drum and altering the speed of revolution of said drum responsive to the pressure differential to build a layer of substantially uniform thickness of glass blowing wool on the drum, and discharging the layer of wool from the drum.

DESCRIPTION OF THE DRAWINGS

The FIGURE is a view in isometric of the apparatus of this invention.

DESCRIPTION OF THE INVENTION

Referring now to the FIGURE there is shown conduit 1 opening into shroud 2 which has a foraminous-surfaced rotatable drum 3 rotating within a portion thereof. The drum is driven by any suitable means, preferably variable speed A.C. or D.C. motor 4. A vacuum is drawn from the inside of the drum to establish a pressure drop across the foraminous surface 5 of the drum.

The openings in the surface of the drum are of any suitable size. Preferably, they are of a size suitable for retaining the glass wool particles thereon while allowing the glass fines to pass there through.

The exterior of the drum is adapted with vanes 6 extending longitudinally along the surface thereof. Any suitable number of vanes can be employed. Preferably, they will be positioned such that several are in contact with the shroud at all times, the spacing being such that as the drum turns to rotate one vane out of contact with the shroud, another vane comes into contact with the shroud at the opposite side of the shroud.

In this manner, air leakage between the drum and the shroud is minimized. When the drum has rotated to that position at which the glass wool can be discharged into the bagging equipment, that section between the vanes no longer is under vacuum and the glass wool falls from the drum.

Preferably the vanes will be flexible so as to provide a relatively tight seal with the shroud. Additionally, the vanes can be rubber-tipped to further facilitate the seal and to provide a member which can be replaced when worn.

Interconnected to the variable speed motor will be differential pressure transmitter 7. This transmitter, in turn, is connected to two static pressure probes, the first 8 located preferably in the conduit carrying the glass wool onto the rotary drum and the second 9 located within the rotating drum. The transmitter is responsive to the pressure differential established between the two probes such that as the pressure differential increases, the rotational speed of the drum is increased. In this manner, this control system acts to maintain a uniform pack height on the drum at all times. This uniformity insures that entrapment of glass fines by the pack is at a maximum at all times. Accordingly, fewer glass fines pass through the pack with the air, thus reducing glass losses and air-glass fine separation problems. This control system is particularly advantageous because, in its absence, wide variations of the quantity of blowing wool introduced onto the drum are common and uniformity of pack thickness can not be maintained.

Furthermore, it has been found that due to the uniformity of the pressure applied to maintain the glass blowing wool on the surface of the drum, less glass wool is over-compressed on the surface of the drum with the result that the recovery of the glass wool from its compressed state to its relaxed state, that is, its effective volume, is increased.

It will be evident from the foregoing that various modifications can be made to this invention. Such, however, are considered within the scope of the invention.

I claim:

1. A method of improving the recovery of glass blowing wool which comprises:
   a. introducing the wool into contact with the foraminous surface of a revolving drum;
   b. establishing a pressure differential across said surface of said drum by vacuum producing means;
   c. altering the speed of revolution of said drum responsive to said pressure differential to build a layer of glass wool of substantially uniform thickness on the drum; and,
   d. discharging said wool from said drum.

2. The method of claim 1 in which said wool is carried onto said foraminous surface in a gaseous stream.

3. The method of claim 1 in which said drum is driven by an electric motor and said speed of revolution is altered by altering the current to said motor.

4. The method of claim 1 in which said wool is discharged from said drum into a bagger.

5. The method of claim 1 in which said pressure differential is established between a locus within said drum and a locus within a conduit transporting said wool onto said drum.

6. Apparatus comprising:
   a. a conduit terminating in a shroud;
   b. a motor-driven, foraminous-surfaced, rotatable drum positioned to rotate within said shroud;
   c. vanes positioned longitudinally along the exterior surface of said drum and extending outwardly into contact with said shroud;
   d. differential pressure sensing means positioned to sense a pressure differential across said foraminous surface;
   dd. means associated with said drum to establish a pressure drop across a portion of the foraminous surface of said drum, and,
   e. a differential pressure transmitter responsive to said sensing means to alter the speed of rotation of said motor-driven drum.

7. The apparatus of claim 6 in which said differential pressure sensing means comprises a pressure probe mounted in said conduit and a pressure probe mounted within said drum.

8. The apparatus of claim 6 in which said vanes are flexible and comprises a replaceable wearing surface.

9. The apparatus of claim 6 in which said drum is driven by a direct current motor.

10. The apparatus of claim 9 in which the speed of said motor is adapted to increase upon an increase in pressure differential.

* * * * *